No. 755,302.                                                                 Patented March 22, 1904.

UNITED STATES PATENT OFFICE.

ERNEST A. LE SUEUR, OF OTTAWA, CANADA.

EXTRACTION OF COPPER FROM COMMINUTED MINERAL MIXTURES.

SPECIFICATION forming part of Letters Patent No. 755,302, dated March 22, 1904.

Application filed May 27, 1899. Serial No. 718,486. (No specimens.)

*To all whom it may concern:*

Be it known that I, ERNEST A. LE SUEUR, a subject of the King of Great Britain, residing at Ottawa, in the county of Carleton, Province of Ontario, Canada, have invented certain new and useful Improvements in the Extraction of Copper from Comminuted Mineral Mixtures, of which the following is a specification.

My invention consists in treating said material with an ammoniacal solution containing a reagent or mixture of reagents capable of oxidizing copper. While it has long been known that a water solution of ammonia will dissolve copper oxid and while it is comparatively easy to dissolve copper scrap, filings, or turnings, &c., by treating them with a solution of ammonia exposed to the air and to consequent oxidation, the present problem is a very different one.

What I propose to treat by my process is not a mass of metallic copper, but a mixture containing a very small percentage (in point of fact usually less than one per cent.) of that metal. The consequence is that the (comparatively) little copper there is is, so to speak, buried out of sight in the mass of sands or mud inclosing it, and as oxidation of the copper before it can go into solution is essential it is a hopeless task to attempt to secure such solution by merely exposing to the air a mass of this mixture submerged in ammonia. In this latter case the copper in the very top layer of the mud will be oxidized and go into solution; but that is all.

So far as I know my method of introducing an oxidizing agent into the solution and leaching or otherwise treating the mixture with said solution is absolutely novel. With reference now to the reagent or reagents to be used to effect oxidation of the copper it is the case that certain cupric compounds (I prefer the hydroxid) in solution in ammonia or its carbonate will slowly give up a portion of their oxygen to the metallic copper. The solution that I prefer, however, depends for its usefulness on the remarkable fact which I have discovered—that an ammoniacal solution of cupric hydroxid, for instance, has its oxidizing powers extraordinarily enhanced by the addition of certain apparently inert salts of ammonia. The salts I prefer for this purpose are the sulfate and nitrate, and when a small quantity of either or both of these is added to the above-mentioned solution the rapidity with which said solution attacks finely-divided copper is extraordinary. For instance, in making experiments on certain of the waste sands from the stamp-mills of the Calumet & Hecla Mining Co. I have found half of the total copper go into solution in less than eight minutes. I may here point out that the use of ammonium chlorid is objectionable on account of the danger (should electrolytic extraction be adopted) of formation of the fearfully dangerous compound, nitrogen chlorid.

The solution may be allowed to act either with or without access of air, or it may be allowed to act with a certain amount, although insufficient to fully oxidize the extracted copper of such access. If the solution is exposed to the air at intervals during the working of the method, the oxygen which was abstracted from it to oxidize into solution the desired copper will be replaced by the oxygen of the air. If, on the other hand, no access of air be permitted, the solution will be deoxidized (in the case of the above-described solution so as to contain cuprous instead of cupric compounds) and the copper going into solution will do so to the cuprous form. The disadvantage of this way of practicing the method is that it is necessary to carry in the solution sufficient oxidizing effect to take out the whole of the copper to be extracted. On the other hand, using access of air we have the advantage that as the copper increases in the solution in the cupric form the oxidizing power of the solution grows.

In working my process the reactions are as follows: To begin with the composition of my solvent solution may be stated thus:

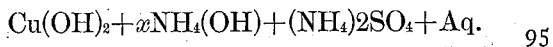

$$Cu(OH)_2 + xNH_4(OH) + (NH_4)_2SO_4 + Aq.$$

In this formula, $x$ is greater than 2, and the ammonium sulfate may be replaced by other salts of ammonium. As the solution grows older with repeated use it may accumulate other inert matters in solution, depending on the particular method of precipitation of the copper which is adopted. When this solution is applied to the copper in the waste sands above mentioned, the cupric hydroxid is reduced, sometimes completely, to the cuprous form, as follows:

The ammonium sulfate appears to suffer no chemical change any more than does the ammonia itself; but the mixture of the two enables a very much more rapid solution of the copper to occur than does even a decidedly-stronger ammoniacal solution of cupric hydrate alone.

Having described the means of getting the copper into solution, I now proceed to a discussion of the means of extracting it from said solution.

The extraction may proceed along either one of two general lines. The first is electrical extraction, and the second is chemical precipitation. The particular method to be used depends, moreover, on whether the copper is to be removed from the cuprous or the cupric form.

As regards electrical extraction, it will be observed that the problem is not what is usually the case in electrolyzing copper solutions—that is to say, the result to be attained is not to remove copper from a more or less impure anode and lay it down in a state of purity on a cathode; but what we require to do is to lay down upon the cathode the copper contents (or a portion of them) of the solution itself. What this amounts to is that we must either use an insoluble anode or else an anode the products of attack of which will not appear at the cathode and so contaminate the copper. Under the first head we may place the noble metals, such as platinum, and in the second the only commercially available material is iron. In the use of iron anodes in this work the following occurs: The iron is oxidized to the ferrous form, and as such is soluble in the ammonia. The iron will not, however, make its appearance at the cathode along with the copper so long as the latter remains in excess in the solution and the current density is not too high. Furthermore, I adopt the following expedient to remove the iron from the solution: I expose the solution to sufficient access of air to convert the ferrous iron to the ferric form. As soon as this happens the ferric compound leaves the solution as an insoluble precipitate and is thereafter available as a pigment. A material for an anode which occupies a position midway between the two above-described classes is carbon. On the one hand, it is more or less attacked by the action of the cell; but, on the other hand, the products are gaseous, and so do not require any further consideration.

Where it is practicable to do so, the most elegant method of working the process is to dissolve the copper without (or with but little) access of air to the cuprous form, then to electrolyze with an insoluble anode away from the air until one-half of the copper has been removed. In this case no oxygen appears at the anode; but the nascent oxygen attacks the cuprous solution to form cupric until just one-half of the copper in solution in the cuprous form at the commencement of electrolysis remains. The electrodecomposition of the cuprous compounds gives twice the copper per unit of current that the electrolysis of cupric copper does, and at the moment that the reducing powers of the solution are satisfied we arrive back at the point we started from as regards the amount of copper (cupric) held by the solution, and the latter is ready to be used over again. This statement is strictly true only where, on the one hand, no wastes of solution occur, and, on the other, no atmospheric oxidation has occurred during the process. In practice there is unavoidably a little of both, and these may be regulated so as to just neutralize each other and keep the amount of cupric copper in the solution at the end of any run constant.

Referring to the second general method of extracting the copper—that is to say, by chemical precipitation—there is of course the obvious and well-known means of throwing out the copper as sulfid. I prefer, however, to use the following: I add to the solution a quantity of the cheapest mineral acid locally producible or obtainable in quantity less than sufficient to completely neutralize the ammonia. In this country the acid I prefer is the so-called "chamber sulfuric acid." The effect of such addition is to precipitate such of the copper (as was held in solution by that portion of the ammonia neutralized) in the form of copper hydroxid, or it may be basic or other carbonate. This precipitate can be very readily removed from the solution by filtering or merely by allowing to settle. With a view to expedition I prefer the former. The object in leaving the ammonia in excess after the treatment is twofold. In the first place, as an acid reaction is avoided, the solution has no effect (such as it would have if slightly acid) upon, for instance, an iron-containing tank. The chief reason, however, is to secure a retention by the solution of a certain amount of dissolved cupric compound with a view to its oxidizing power on the next batch of cuprous material treated in accordance with what I have above set forth.

The precipitate obtained as above is immediately available as a pigment. It may also be conveniently used as a basis for the manufacture at a minimum of expense of copper sulfate. Should, however, the object of working be the production of metallic copper, the said precipitate can be smelted at a very low temperature with a little carbonaceous material to the metallic form.

The above operations are carried on in rotation and the solution with its ammoniacal and other contents is used over and over without loss excepting only certain small mechanical wastes.

In the case of precipitating the copper with an acid it is necessary before using the solution again to add enough of a suitable alkali to displace from combination with said acid the ammonia by which it is taken up. The result of this addition is to cause to accumulate in the solution the compounds resulting from the union of said acid and alkali. This, however, is usually unobjectionable.

The cheapest method known to me for the preparation of a solution which will fulfil the purposes for which it is intended is to simply make a mixture of ammonium sulfate and a suitable alkali in quantity sufficient to liberate enough free ammonia or ammonium carbonate to fulfil its purposes as a solvent. The cupric oxidizer may be added in any convenient way—as, for instance, in the form of solution of copper sulfate.

In working the process either with electrolytic or chemical extraction the great advantage will be obvious of not having to throw out all the copper at each operation, but only part, and of having the solution in shape to be used over and over again. Should it be necessary in order to save it to extract all the copper every time, the labor and trouble would be many times what it is in this case, where a part only is extracted and the rest allowed to work around again.

I am aware that proposals have been put forward for the ammoniacal extraction of copper oxid from mixtures containing it, and the striking feature of difference between such proposals and my invention is that in carrying said proposals into operation the cupric contents of the solution increase as solution proceeds, whereas in my process the said contents diminish as solution progresses.

What I claim is—

1. The method of dissolving metallic copper out of mixtures containing it which consists in treating said mixtures with ammoniacal solution containing a reagent or mixture of reagents capable of oxidizing copper, substantially as described.

2. The method of dissolving metallic copper out of mixtures containing it which consists in treating said mixtures with an ammoniacal solution containing cupric compound or compounds, substantially as and for the purposes set forth.

3. The method of dissolving metallic copper out of mixtures containing it which consists in treating said mixtures with an ammoniacal solution containing a cupric compound or compounds and a salt or salts of ammonia, substantially as set forth.

4. The method of obtaining metallic copper from mixtures containing it which consists, first in treating said mixtures with an ammoniacal solution containing a cupric compound or compounds so as to dissolve the desired copper, then in removing a portion of the total copper contents of the solution, and lastly in using the partially-exhausted solution over again to dissolve fresh copper as before, substantially as described.

In testimony whereof I affix my signature in presence of two witnesses.

ERNEST A. LE SUEUR.

Witnesses:
 T. D'ARCY McGEE,
 W. S. EDWARDS.